United States Patent [19]

Stoev et al.

[11] 4,039,456
[45] Aug. 2, 1977

[54] COUNTER CURRENT FLOW VIBRO-ACOUSTICAL EXTRACTION APPARATUS

[75] Inventors: Stoycho Mitrev Stoev; Marin Dimitrov Mitrushev; Grozdan Todorov Boshilov; Maria Georgieva Radeva, all of Sofia, Bulgaria

[73] Assignee: Vish Minno-Geoloshki Institute-Nis, Sofia, Bulgaria

[21] Appl. No.: 572,342

[22] Filed: Apr. 28, 1975

[51] Int. Cl.$^2$ .................... B01D 33/00; B01D 35/20
[52] U.S. Cl. .................................. 210/388; 209/268; 210/DIG. 18
[58] Field of Search ............... 210/388, 389, 319, 384, 210/385, DIG. 18; 209/269, 309, 365 R, 365 B, 382, 233, 1

[56] References Cited

U.S. PATENT DOCUMENTS

| | | | |
|---|---|---|---|
| 2,312,969 | 3/1943 | Jönsson | 209/269 |
| 2,505,513 | 4/1950 | Young et al. | 210/388 |
| 2,538,285 | 1/1951 | Swayze | 209/269 |
| 2,638,220 | 5/1953 | Schneider | 209/269 |
| 2,883,051 | 4/1959 | Maeder | 209/269 |
| 2,886,178 | 5/1959 | Davis et al. | 210/DIG. 18 |
| 3,021,952 | 2/1962 | Powell | 209/233 |
| 3,195,729 | 7/1965 | Kracklauer et al. | 210/388 |
| 3,782,547 | 1/1974 | Dietert | 209/1 |
| 3,928,207 | 12/1975 | Wace et al. | 210/388 |

*Primary Examiner*—Frank W. Lutter
*Assistant Examiner*—Frank Sever

[57] ABSTRACT

Extraction apparatus wherein solid and liquid phases are subjected to vibro-acoustical action in order to intensify the extraction process. The apparatus includes an enclosure forming a working cell, spring means mounting such cell for vibratory movement, a vibrator mounted on the cell to vibrate, two laterally displaced feeding openings at the top of the cell for receiving, respectively, solid particulate material and liquid, two laterally spaced discharge outlets on the cell for discharging, respectively, solid material and liquid, and a screen mounted inside the cell across the liquid discharge opening.

4 Claims, 4 Drawing Figures

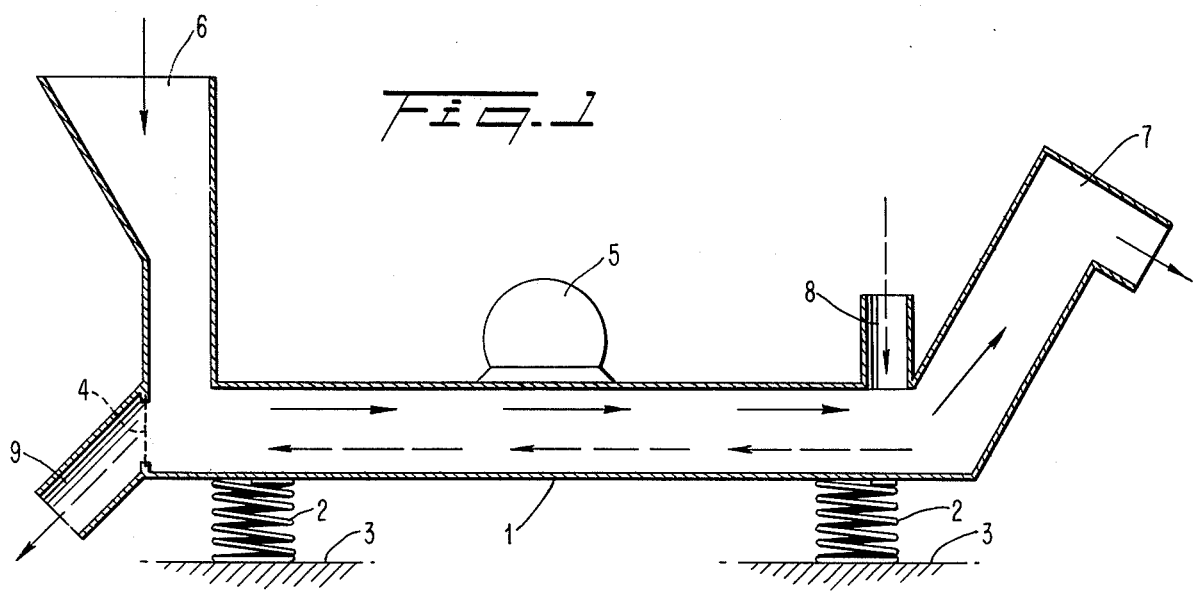
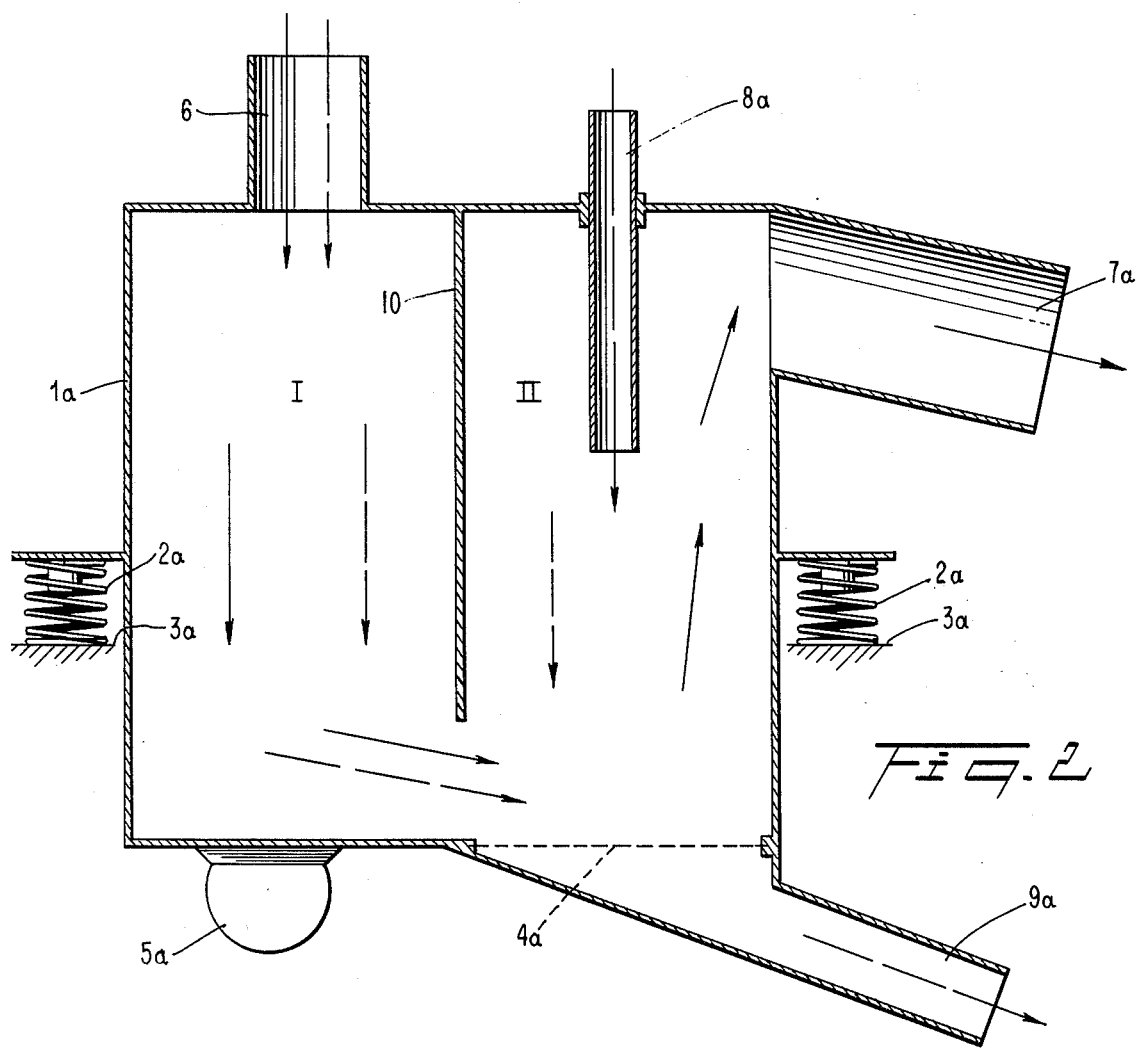

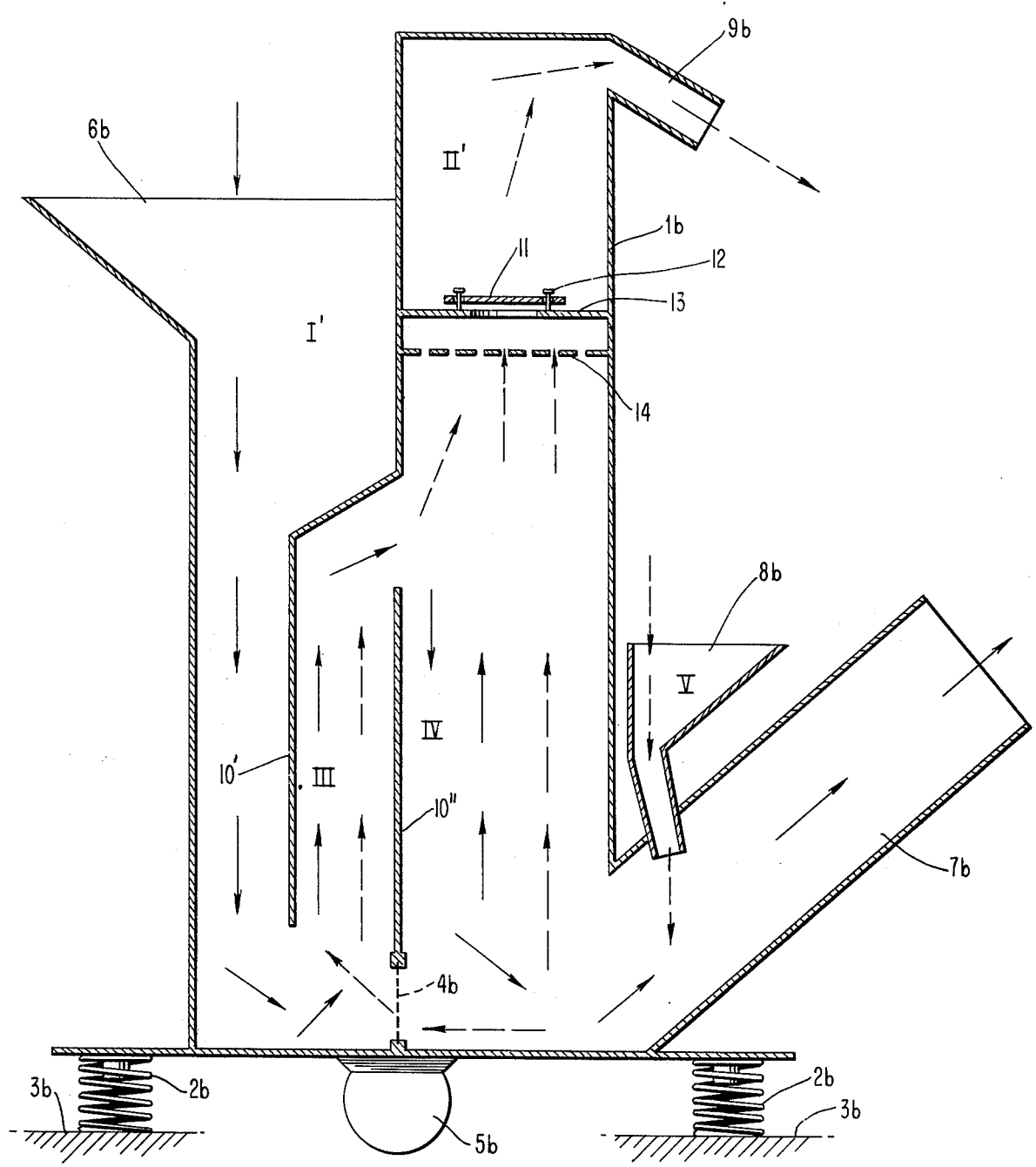

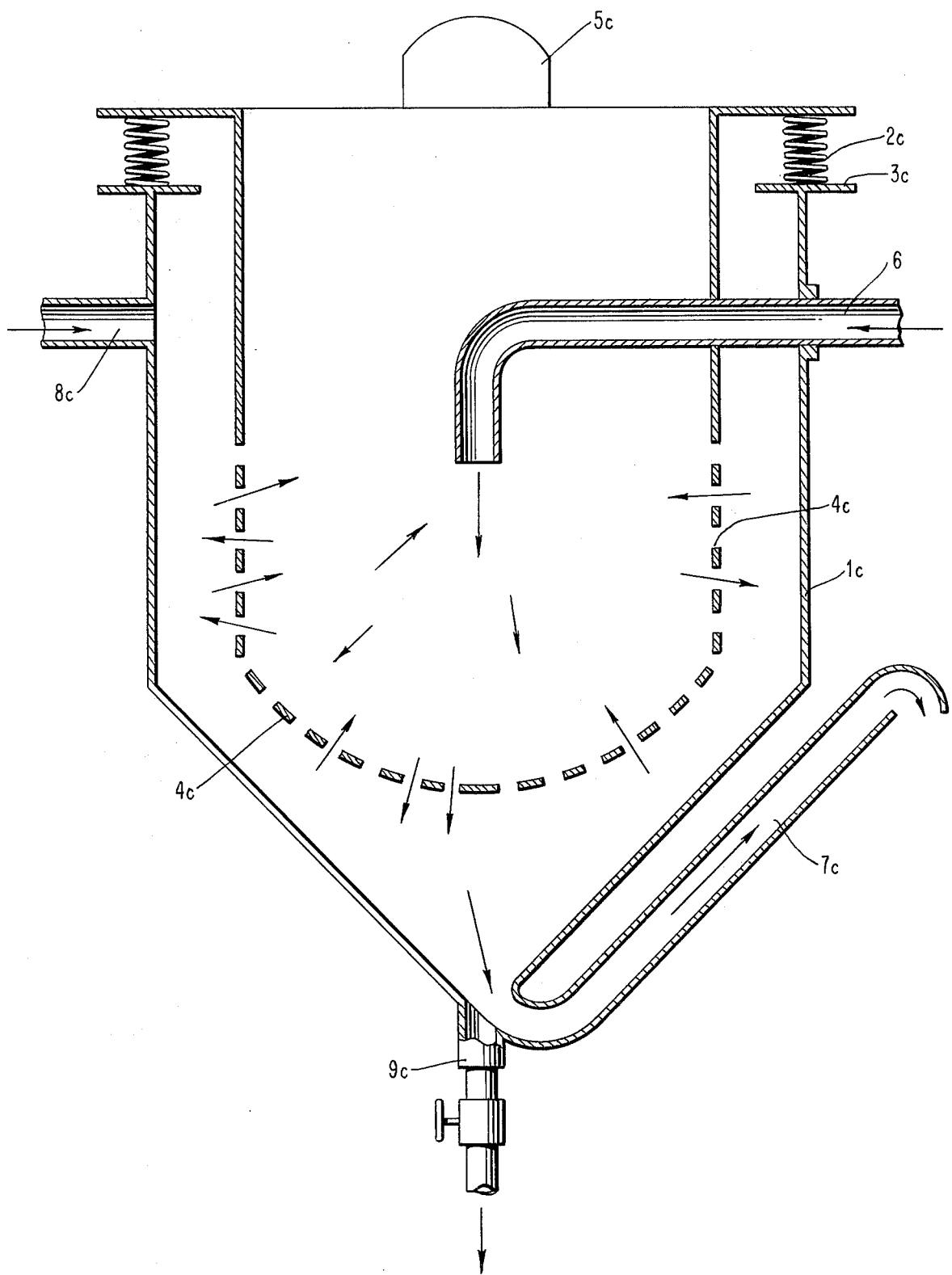

COUNTER CURRENT FLOW VIBRO-ACOUSTICAL EXTRACTION APPARATUS

This invention relates to extraction apparatus, and more particularly to apparatus wherein solid and liquid phases are subjected to vibro-acoustical action in order to intensify the extraction process.

Prior extraction apparatus operate by means of mechanical, pneumatic or pulsation mixing of the solid and liquid phases. The common disadvantages of these devices is that they cannot assure a rapid removal of the products of reactions in the boundary layers. Because of this, the processes are of comparatively low velocity, i.e., of relatively low output.

Another disadvantage of the presently available prior extractors is that they require the use of large quantities of metal and are of large volume, so that high capital investment are necessary to build them. The driving means for such prior extractors are relatively complex, which makes their maintenance difficult and costly, and complicates automation of the process.

The present invention has among its objects the provision of extracting apparatus which is free from the above-outlined disadvantages of the prior art.

In accordance with the present invention there is provided an extraction apparatus which functions by vibration action on mixtures of solid and liquid phases to be treated, with a resultant rapid removal of the products of the reactions in boundary layers. In accordance with the invention there is provided a working ceel completed with a vibrator, the cell and vibrator being mounted on springs supported on a fixed foundation. The apparatus has two feeding and two discharging openings, and a screen is installed inside it. The advantage of the apparatus of the invention is that it assures rapid removal of the products of reactions in the boundary layers, and thus makes possible a process which proceeds at a high velocity and produces high outputs.

Several preferred embodiments of the vibration extractor of the invention are shown in the accompanying drawings, wherein:

FIG. 1 is a schematic view in cross section of a valveless counter-current vibration extractor;

FIG. 2 is a schematic view in cross section of a valveless direct-countercurrent vibration extractor;

FIG. 3 is a schematic view in cross section of a valved vibration extractor, and FIG. 4 is a schematic view in cross section of the vibration extractor with a perforated vessel mounted within the cell.

Turning first to FIG. 1, an elongated working cell 1 is mounted on longitudinally spaced coil compression springs 2 which are supported upon a fixed foundation 3. A vibrator 5 is mounted upon the top of the cell 1, the vibrator being of the well-known type wherein it imparts a rapid stroke to its supporting structure in one horizontal direction and a somewhat slower recovery stroke thereto in the opposite direction. In the construction of FIG. 1 the vibrator 5 moves the cell 1 relatively slowly to the right in one half of its working cycle and more rapidly to the left in the other half of its working cycle. The working cell 1 is provided at its left-hand end with an upper, solid material feeding means such as a hopper 6 and with a lower liquid discharge conduit means 9. A vertical screen 4 is disposed across the entrance end of the conduit means 9. At its right-hand end the cell 1 is provided with an upper liquid feeding conduit means 8, and with an upwardly and then downwardly slanting conduit means 7 for the discharge of solid material.

The apparatus described in FIG. 1 functions as follows: When the vibrator 5 is switched on, the solid material phase, due to the feeding action of the vibrator 5, moves from the left-hand end to the right-hand end of the cell 1. During such transportation of the solid material, the grains making up the solid material are intensively vibrated in contact with the liquid phase which enters the working cell 1 through the conduit means 8. The liquid, indicated in the drawing by a dash line, thus moves from right to left, whereas the solid particles move from left to right, as indicated by the solid line arrows. The solid phase and the liquid phase thus move in countercurrent that is opposite directions.

In an unillustrated embodiment, the construction of FIG. 21 can be essentially maintained but solid material and liquid can be introduced, for example, at the left of the cell, and the liquid discharge conduit means of FIG. 1 with its screen 4 can be removed from the left-hand end of the cell and positioned at the right-hand end thereof. In such further embodiment, the solid material and the liquid move in the same direction and thus constitute a direct-current extractor.

A second illustrated embodiment of the extractor of the invention is shown in FIG. 2. In such figure parts which are generally similar to those shown in FIG. 1 are designated by the same reference character with an added a. In the apparatus of FIG. 2 solid particulate material and liquid, designated by solid arrows and dash arrows, respectively, enter the same inlet conduit means 6a positioned at the upper left portion of the working cell 1a. The working cell, in this instance, is divided into two serially arranged chambers I and II, the two chambers being divided at their upper ends by a partition or baffle 10 which extends from the top of the cell downwardly toward but spaced from the bottom thereof thereby leaving a path of communication between the two chambers. Liquid is introduced into the chamber II at a position somewhat above the vertical center thereof through a liquid inlet conduit means 8a. The vibrator 5a is attached to the bottom wall of the cell. The cell is supported, as before, upon coil compression springs, such springs 2a in this instance being interposed between foundation abutments 3a and wing structures extending from opposite end walls on the cell.

Solid particulate material is discharged through a discharge conduit means 7a which is connected to the upper end corner of the chamber II. Liquid is discharged from the bottom of chamber II through a horizontal screen 4a and thence through a downwardly sloping liquid discharge conduit means 9a.

FIG. 3 illustrates a further embodiment of the extraction device of the invention. In this figure, with the exception of partitions or baffles 10' and 10", parts which are similar to those shown in FIG. 1 are designated by the same reference characters but with an added b. The working cell 1b is divided by a stepped partition 10' extending from the top of the cell to a position near but spaced from the bottom thereof and by a vertical screen 4b and a partition or baffle 10" forming an extension thereof and extending upwardly near but spaced from the step of partition 10' into three serially functioning chambers I', III', and IV'. The upper end of chamber V' communicates with a further chamber II' through a horizontal screen 14 and a valve having a movable valve member 11 vertically guided on guides 12 which are supported on a ring 13 secured to the walls of the chamber II'. The valve 11 is also disclosed in the co-assigned companion Stoev et al application Ser. No. 572,457, filed of even date and entitled "Pneumo-Hydraulic Vibrator." A liquid discharge conduit means 9b is connected to the upper outer corner of the chamber II'. Solid particulate matter is discharged through an upwardly inclined solid discharge conduit means 7b which is connected to the outer lower corner of the chamber IV'. The fifth chamber V' is provided by a liquid inlet means 8b which discharges at its lower end into the lower end of the solid discharge conduit means 7b adjacent the chamber IV'.

The apparatus of FIG. 3 functions as follows:

Whenever the vibrator 5b is switched on, the solid phase, which is introduced at 6b and proceeds in the path designated by the solid arrows moves downwardly through chamber I' and upwardly through the chamber III' where it meets liquid which has been introduced through the means 8b, which has flowed through the screen 4b and flows upwardly into the chamber III' as shown by the dash arrows. The solid particulate material and the liquid raise in chamber III', the liquid flowing upwardly through the screen 14 through the chamber II' and out through the liquid discharge conduit 9b. The solid material, after having passed over the top of the partition 10'', flows downwardly within the chamber IV' and thence into the solid discharge conduit means 7b.

The upward flow of the liquid through the chamber III', the upper end of the chamber IV', and through the chamber II' is achieved as a result of the sucking effect upon such chambers by the valve 11. Thus due to the vibration of cell 1b by the vibrator 5b the freely mounted valve member 11 vibrates in a vertical direction, thereby functioning as a vibrating pump. The screen 14 prevents the escape of solid material with the liquid which passes upwardly through the valve 11 and into the chamber II'.

A still further embodiment of the invention is shown in FIG. 4. In such figure parts which are similar to those shown in FIG. 1 are designated by the same reference characters but with the addition of the letter c.

In FIG. 4 the working cell 1c as a circular cylindrical upper portion the lower end of which communicates with a frusto-conical portion. The lower end of the frusto-conical portion of the working cell is connected to an upwardly and outwardly solid material discharge conduit means 7c. Also attached to the lower end of the frusto-conical portion of the cell, but displaced laterally somewhat from the inlet end of the solid material discharge conduit 7c it is a liquid discharge conduit means 9c having a selectively operable shut-off valve interposed therein. Disposed within the working cell 1c coaxial thereof and suspended from its upper wall is a vessel 4c having perforated side walls spaced somewhat from the side walls of the upper, circular cylindrical portion of the working cell.

A particulate solid material is led into the vessel or chamber 4c through an inlet conduit means 6c, as shown. Liquid is led into the working cell through a conduit means 8c disposed adjacent the upper end of the cell.

The apparatus shown in FIG. 4 operates as follows: At the switching on the vibrator 5, the perforated wall vessel 4c is set in motion. As shown, liquid introduced through the conduit means 8c finds its way through the perforations in the side wall of the vessel 4c along the path indicated by the dash arrows. Solid particulate material likewise passes through such perforations from the interior of vessel 4c into the cell 1c proper and thence to the lower entrance end of the discharge conduit means 7c. The paths taken by the solid particulate material are indicated by solid line arrows.

The vibrator 5c is preferably of a known construction, and subjects the cell 1c to vibrations in a plurality of directions. Such vibrator may employ, for exmaple, a driven shaft journalled in a structure secured to the cell 4c, the being an eccentrically disposed weight secured to the shaft.

The construction shown in FIGS. 1 and 2 are more suitable for light and medium extraction conditions, and that shown in FIG. 3 for extractions which are more difficult to carry out. The construction shown in FIG. 4 is the most suitable for processes conducted at lower speed.

The extractors of the invention are useful in many different applications: In the washing of mineral surfaces for the removal of clay and other films therefrom, in hydrometallurgical treatments (the solid phase is the respective mineral raw material, and the liquid one is the respective leaching solution), and in ion-exchange technologies (the solid phase being the ion-exchange resin or metal, and the liquid phase being the corresponding liquid).

This application is related to application Ser. No. 572,456, filed on Apr. 28, 1975, now abandoned entitled METHOD OF AND APPARATUS FOR MINERAL PROCESSING; application Ser. No. 572,095, filed Apr. 28, 1975, now entitled METHOD OF AND APPARATUS FOR EMULSIFICATION; and, application Ser. No. 572,457, filed Apr. 28, 1975, now abandoned entitled MATERIAL TREATING APPARATUS INCLUDING PNEUMO-HYDRAULIC VIBRATOR, all co-assigned with the present application and filed of even date by Stoev et al.

Although the invention is illustrated and described with reference to a plurality of preferred embodiments thereof, it is to be expressly that it is in no way limited to the disclosure of such a plurality of preferred embodiments, but is capable of numerous modifications within the scope of the appended claims.

What is claimed is:

1. Apparatus for separating liquid and solid phases of a suspension, comprising in combination, an enclosure forming a working cell defining a flow path having a first lateral end and a second lateral end, a stationary support, spring means mounting such cell on said stationary support for vibratory movement, a vibrator mounted on the cell to vibrate it, two laterally displaced feeding openings at the top of the cell for feeding, respectively, solid particulate material to said first lateral end of said flow path and liquid material to said second lateral end of said flow path, two laterally spaced discharge outlets on the cell for discharging, respectively, a solid material component of the fed material from said second lateral end of said flow path and a liquid material component of the fed material from said first lateral end of said flow path and a screen mounted vertically inside the cell across the liquid discharge opening and fully covering said liquid discharge opening and secured to said cell so as the vibrate jointly therewith; said vibrator effecting a countercurrent flow within said working cell between said solid and liquid material components.

2. Apparatus according to claim 1, wherein the solid feeding opening and the liquid discharge opening are located adjacent each other, and the liquid feeding opening and the solid discharge opening are located adjacent each other.

3. Apparatus according to claim 1, wherein said cell has a bottom and a top, the springs are disposed at the bottom of the cell and the vibrator is mounted between the springs, and comprising two longitudinally spaced transverse partitions one of which extends from the top of the cell to a position adjacent the bottom thereof and the second of which has a screen at its lower end attached to the bottom of the cell, above the screen the second partition extending upwardly into overlapping relationship with the first partition, the two partitions dividing the cell into first, second, and third serially arranged generally vertically disposed chambers, a second, horizontally disposed screen extending across the top of the third chamber, a fourth chamber disposed above the upper end of the horizontal screen, a selectively operable valve disposed above the second, horizontal screen controlling flow of liquid from the upper end of the third chamber into the lower end of the fourth chamber, a liquid discharge orifice at the upper end of the fourth chamber, said third chamber having an outer vertical wall, a solid material discharge conduit connected to the outer wall of the third chamber, and a fifth, liquid receiving chamber having a discharge orifice connected to the solid material discharge conduit.

4. Apparatus for separating liquid and solid phases of suspension, comprising in combination, an enclosure forming a working cell and having a front wall, a back wall, a pair of oppositely disposed side walls, a top wall and a bottom wall;

a stationary support;

spring means mounting said cell on said stationary support;

a vibrator secured to the bottom wall of said working cell and adapted to vibrate said cell;

a partition extending from said front wall to said back wall and from said top wall to a position adjacent but spaced from the bottom wall of the cell so as to divide said working cell into two serially disposed chambers which are in communication with each other;

a first chamber having a first feed opening in said top wall for charging said first chamber with liquid and solid material; the second chamber defining a flow path with an upper end and a lower end, having a second feed opening in said upper end of said flow path for charging said second chamber with liquid material;

said second chamber having a first discharge opening for discharging liquid material from said lower end of said flow path;

a horizontal screen mounted in said second chamber at said lower end of said flow path fully covering said first discharge opening; and said second chamber having a second discharge opening at said upper end of said flow path for discharging solid material, whereby countercurrent flow is effected between said solid material and said liquid material in said second chamber.

* * * * *